United States Patent [19]

Takahashi et al.

[11] Patent Number: 5,844,868
[45] Date of Patent: Dec. 1, 1998

[54] DIGITAL-ANALOG SHARED CIRCUIT IN DUAL MODE RADIO EQUIPMENT

[75] Inventors: Chusei Takahashi; Tsutomu Katsuyama, both of Tokyo, Japan

[73] Assignee: Oki Electric Industry Co., Ltd., Tokyo, Japan

[21] Appl. No.: 824,794

[22] Filed: Mar. 26, 1997

[30] Foreign Application Priority Data

Apr. 17, 1996 [JP] Japan .................................... 8-094933

[51] Int. Cl.$^6$ ................................................... H04B 1/20
[52] U.S. Cl. ................................ 369/6; 375/216; 455/403
[58] Field of Search .................................... 369/6, 7, 8, 1, 369/2, 3, 4; 360/32; 375/216, 242; 455/403, 575, 345, 344

[56] References Cited

U.S. PATENT DOCUMENTS 5,515,397  5/1996  Wiorak ..................................... 345/216

*Primary Examiner*—Tan Dinh
*Attorney, Agent, or Firm*—Spencer & Frank

[57] ABSTRACT

A digital-analog shared circuit in dual mode radio equipment, which shares a local oscillator in a digital mode and analog mode. A first frequency synthesizer generates a first and a second local oscillation frequency in a digital and an analog receiving mode, respectively, in response to a control signal from a switching control. In the digital receiving mode, a quadrature demodulater including a first and a second demodulator in a demodulator section is enabled, and carries out quadrature detection of a received signal fed from an RF stage, thereby supplying the detected signal to a baseband signal processor stage. In the analog receiving mode, a buffer to which the second local oscillation frequency is supplied is enabled to deliver the second local oscillation frequency to the analog IF stage. A second frequency synthesizer generates a third local oscillation frequency in a digital transmitting mode and a fourth local oscillation frequency in an analog transmitting mode. In the digital transmitting mode, a quadrature modulator including a first and a second modulator is enabled to carry out quadrature modulation using the third local oscillation frequency. In the analog transmitting mode, the fourth local oscillation frequency undergoes frequency modulation by an analog modulating signal, and the modulated signal is in turn supplied to the RF stage through the second modulator.

7 Claims, 6 Drawing Sheets

Fig. 3

| EXTERNAL TERMINAL NO. | | EXTERNAL CONTROL SIGNAL | | |
|---|---|---|---|---|
| | | MODE(301) | IDLE(302) | SLEEP(303) |
| DIGITAL | IDLE(RECEPTION) | H | L | H |
| | SLEEP | H | L | L |
| | OPERATION (TRANSMISSION & RECEPTION) | H | H | H |
| ANALOG (FM) | IDLE(RECEPTION) | L | L | H |
| | OPERATION (TRANSMISSION & RECEPTION) | L | H | H |

Fig. 4

| OPERATION MODE | | CIRCUIT NO. | DEMODULATOR SECTION | | | | MODULATOR SECTION | | | | |
|---|---|---|---|---|---|---|---|---|---|---|---|
| | | | 105 | | 109 | 102,103, 104, 107,108 | 206 | | 209 | 202,204, 208,210 | 201,203, 205 |
| | | | PLL | VCO | | | PLL | VCO | | | |
| DIGITAL | IDLE (RECEPTION) | | ON | ON | OFF | ON | OFF | OFF | OFF | OFF | OFF |
| | SLEEP | | OFF | OFF | OFF | OFF | OFF | OFF | OFF | OFF | OFF |
| | OPERATION (TRANSMISSION & RECEPTION) | | ON | ON | OFF | ON | ON | ON | OFF | ON | ON |
| ANALOG (FM) | IDLE (RECEPTION) | | ON | ON | ON | OFF | OFF | OFF | ON | OFF | OFF |
| | OPERATION (TRANSMISSION & RECEPTION) | | ON | ON | ON | OFF | ON | ON | ON | OFF | ON |
| GATE NO. | | | 328 | 326 | 324 | 323 | 327 | 325 | 324 | 322 | 321 |

…

DIGITAL-ANALOG SHARED CIRCUIT IN DUAL MODE RADIO EQUIPMENT

BACKGROUND OF THE INVENTION

1. Field of the Invention

The present invention relates to a digital-analog shared circuit in dual mode radio equipment operable in a digital and an analog mode, which circuit is preferably applied to mobile radio equipment such as hand-held portable telephones and automobile telephones, for example.

2. Description of the Background Art

As is well known in the art, there are analog radio systems and digital radio systems in cellular automobile or hand-held portable telephone systems. The analog radio systems have developed prior to the digital radio systems, and their service areas are not limited to urban areas but have spread across the nation. The analog radio systems, however, cannot catch up with a sharply increasing number of users, and hence an increasing number of the digital radio systems are being used because of their superiority in frequency availability.

The digital radio system, as is well known, is generally divided into a TDMA (time division multiple access) system and a CDMA (code division multiple access) system. The TDMA system transmits signals using time slots provided along the time axis of a single frequency. On the other hand, the CDMA transmits signals after spreading them around a certain frequency using spectrum spreading. Both of these systems divide each digital signal which is obtained by processing a baseband signal into an in-phase signal and a quadrature signal, modulate them using quadrature modulation such as quadrature phase shift keying (QPSK) at an IF (intermediate frequency) stage, and impressing them on a carrier signal at an RF (radio frequency) stage to be transmitted. The digital radio system is said to accommodate 10 to 20 times greater number of channels than the analog radio system.

In contrast, the analog radio system forms an IF signal by the frequency modulation (FM) of a signal obtained by modulating a local oscillation frequency by a baseband signal such as a voice signal, and impressing the IF signal on a carrier signal at the RF stage to be transmitted. Some base stations use an FDMA (frequency division multiple access) method in which the RF signals are transmitted in a frequency division mode.

In the United States, for example, dual mode portable telephones that can operate in both analog and digital cellular systems have been developed under such situations. Those telephones use the RF section in common by sharing the same carrier frequency between the analog and digital modes.

The conventional technique, however, has a problem in that the number of components embedded into the telephone device is great when the intermediate frequencies of the analog and digital modes differ from each other, because local oscillators must be provided separately for the two modes.

SUMMARY OF THE INVENTION

It is therefore an object of the present invention to provide a digital-analog shared circuit in dual mode radio equipment, which can reduce the number of components of the circuit by sharing the IF stage, thereby solving the foregoing problem.

According to a first aspect of the present invention, there is provided a digital-analog shared circuit in dual mode radio equipment having a digital mode and an analog mode, the digital-analog shared circuit comprising: an analog receiver for obtaining an analog baseband signal by downconverting a received signal by a local oscillation frequency; a digital receiver for obtaining a digital baseband signal consisting of an in-phase signal and a quadrature signal by quadrature detecting the received signal; a digital transmitter for generating a digital transmitted signal by quadrature modulating a digital baseband signal; an analog transmitter for generating an analog transmitted signal by frequency modulating a local oscillation frequency signal by an analog baseband signal; and a control circuit for switching between the digital mode and the analog mode by controlling the analog receiver and the digital receiver, and by controlling the digital transmitter and the analog transmitter, wherein the digital receiver includes a first frequency synthesizer for generating a first local oscillation frequency for the quadrature detection in response to a first control signal from the control circuit, the first frequency synthesizer generating, in response to a second control signal from the control circuit, a second local oscillation frequency which is supplied to the analog receiver as a local oscillation signal for the downconversion, the digital transmitter including a second frequency synthesizer for generating a third local oscillation frequency for the quadrature modulation in response to a third control signal from the control circuit, the second frequency synthesizer generating, in response to a fourth control signal from the control circuit, a fourth local oscillation frequency for analog modulation, the second frequency synthesizer including a modulator for frequency modulating the analog baseband signal.

Here, the digital receiver may comprise a buffer circuit for developing the received signal in the form of the in-phase signal and the quadrature signal, a first demodulator for demodulating the in-phase signal fed from the buffer circuit by the first local oscillation frequency fed from the first frequency synthesizer, a phase shifter for shifting a phase of the first local oscillation frequency fed from the first frequency synthesizer by 90 degrees, and a second demodulator for demodulating the phase shifted local oscillation frequency fed from the phase shifter by the quadrature signal fed from the buffer circuit, wherein the control circuit may drive, in a digital receiving mode, the digital receiver by enabling the buffer circuit, the first demodulator, the second demodulator, and the first frequency synthesizer, and may provide, in an analog receiving mode, the analog receiver with the second local oscillation frequency from the first frequency synthesizer by disabling the buffer circuit, the first demodulator and the second demodulator, and enabling the first frequency synthesizer.

The phase shifter may be connected to an output circuit for outputting the second local oscillation frequency to the analog receiver, and the control circuit may enable, in the analog receiver, the output circuit to provide the analog receiver with the second local oscillation frequency from the first frequency synthesizer through the phase shifter.

The digital transmitter may comprise a first modulator for modulating the in-phase signal of the digital baseband signal by the third local oscillation frequency fed from the second frequency synthesizer, a phase shifter for shifting a phase of the third local oscillation frequency fed from the second frequency synthesizer by 90 degrees, a second modulator for modulating phase shifted local oscillation frequency fed from the phase shifter by the quadrature signal of the digital baseband signal, and a multiplier for multiplying signals fed from the first demodulator and the second demodulator, and wherein the control circuit may drive, in a digital transmitting mode, the digital transmitter by enabling the first demodulator, the second demodulator, the multiplier and the second frequency synthesizer.

The second frequency synthesizer may comprise a voltage controlled oscillator including a variable capacitance diode, and wherein the control circuit may enable, in the analog transmitter, the second frequency synthesizer, the multiplier of the digital transmitter, and one of the first demodulator and second demodulator to output, from the multiplier through the one of the first demodulator and second demodulator, the transmitted signal which is modulated with the analog baseband signal fed to the variable capacitance diode of the voltage controlled oscillator, and is produced from the second frequency synthesizer.

The first frequency synthesizer may include a first frequency divider and the second frequency synthesizer may include a second frequency divider, the first frequency divider and the second frequency divider each varying a dividing ratio of their oscillation frequencies, and wherein the control circuit may enable the first frequency divider and the second frequency divider to produce the first local oscillation frequency and the third local oscillation frequency in the digital mode, and may enable the first frequency divider and the second frequency divider to produce the second local oscillation frequency and the fourth local oscillation frequency in the analog mode.

The control circuit may comprise a combination of a plurality of logic circuits, and wherein the control circuit, receiving a mode switching signal commanding switching between the digital mode and the analog mode, an idle signal commanding reception only, and a sleep signal commanding suspension of digital operation, may supply those signals to the digital receiver and the digital transmitter through the logic circuits to control switching among respective modes.

According to the present invention, the digital receiving mode and the analog receiving mode can effectively share, under the control of the control circuit, the first frequency synthesizer which generates the first local oscillation frequency for the quadrature detection in the digital receiving mode, and the second local oscillation frequency for downconverting the analog signal in the analog receiving mode. Likewise, the digital transmitting mode and the analog transmitting mode can effectively share, under the control of the control circuit, the second frequency synthesizer which generates the third local oscillation frequency for the quadrature modulation in the digital transmitting mode, and the fourth local oscillation frequency for the analog modulation in the analog transmitting mode.

BRIEF DESCRIPTION OF THE DRAWINGS

The objects and features of the present invention will become more apparent from consideration of the following detailed description taken in conjunction with the accompanying drawings in which:

FIG. 3 shows a truth table of control signals fed to a switching controller of the embodiment;

FIG. 4 shows also a truth table of various signals in digital and analog modes;

DESCRIPTION OF THE PREFERRED EMBODIMENT

Figure 1:
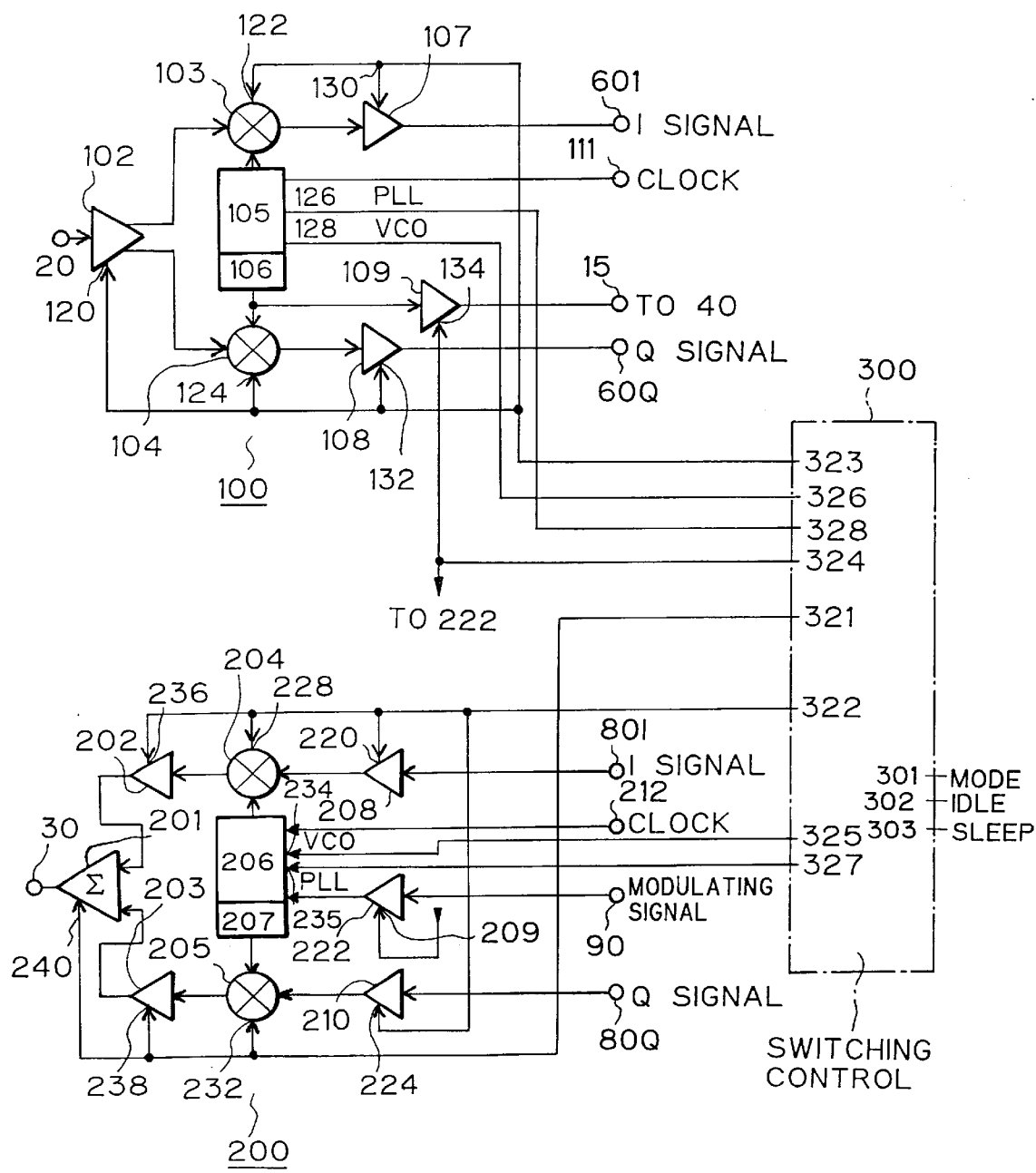
FIG. 1 is a schmematic block diagram showing a major portion of an embodiment of a digital-analog shared circuit in dual mode radio equipment in accordance with the present invention.
Figure 2:
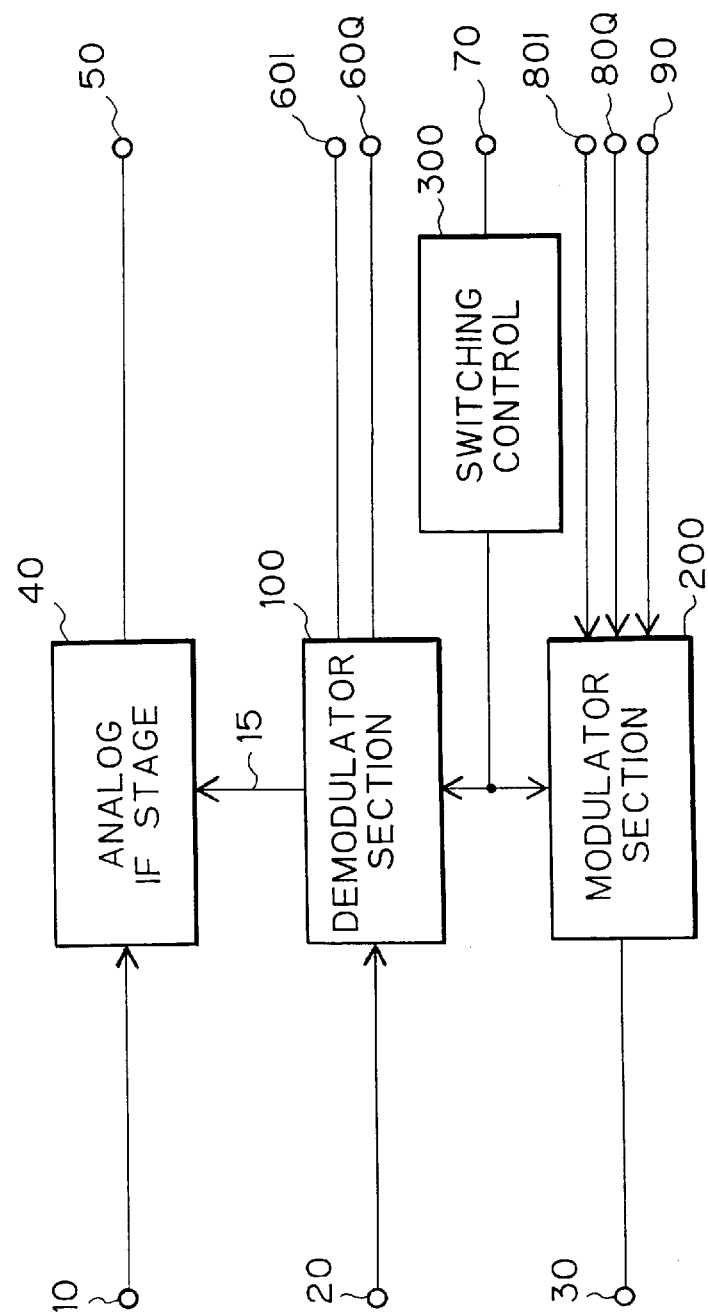
FIG. 2 is a schematic block diagram showing an overall configuration of the embodiment.

The invention will now be described with reference to the accompanying drawings. FIGS. 1 and 2 show an embodiment of a digital-analog shared circuit in dual mode radio equipment in accordance with the present invention. This embodiment of the digital-analog shared circuit is applied to the IF stage of a cellular portable telephone, for example. It includes an analog IF stage 40 for amplifying an analog IF signal fed from the RF stage, a demodulator section 100 for performing quadrature demodulation of a digital IF signal fed from the RF stage, a modulator stage for carrying out frequency modulation of an analog baseband signal and quadrature modulation of a digital baseband signal to provide the modulated signal to the RF stage, and a switching control 300 for switching the modes by controlling the demodulator section 100 and the modulator section 200.

The analog IF stage 40 has an input terminal 10 connected to the RF stage, and an output terminal 50 connected to an analog baseband signal processor stage. In particular, the analog IF stage 40 has a local oscillation input 15 connected to the demodulator section 100. The analog IF stage 40 includes a frequency mixer, an IF amplifier and a bandpass filter, and is adapted to convert the analog IF signal to the baseband signal to be output.

Likewise, the demodulator section 100 has an input terminal 20 connected to the RF stage, and output terminals 60I and 60Q connected to a digital baseband signal processing stage. The modulator section 200 has input terminals 80I and 80Q, and 90 connected to the digital baseband signal processing stage, and the analog baseband signal processing stage, respectively, as well as an output terminal 30 connected to the RF stage. The switching control 300 is connected to a main controller or the like through its input terminal 70, and supplies mode switching signals to the demodulator section 100 and modulator section 200 under the control of the main controller.

The demodulator section 100, modulator section 200 and switching control 300 will now be described in more detail with reference to FIG. 1. The demodulator section 100 of the embodiment includes a buffer circuit 102, two demodulators 103 and 104, a first frequency synthesizer 105, a phase shifter 106 and three buffers 107, 108 and 109. The buffer circuit 102 is a single-input two-output buffer that is adapted to receive the digital IF signal applied to the input terminal 20, and develop it to the two demodulators 103 and 104. The buffer circuit 102 is enabled or disabled in response to the control signal applied to its control terminal 120.

The first demodulator 103 and the second demodulator 104, which constitute a quadrature demodulator, produce an in-phase baseband signal and a quadrature baseband signal, respectively. Specifically, the first demodulator 103 demodulates the IF signal fed from the buffer circuit 102 by the local oscillation frequency fed from the frequency synthesizer 105 to produce the in-phase baseband signal. The second demodulator 104 demodulates the IF signal fed from the buffer circuit 102 by the local oscillation frequency whose phase is shifted by 90 degrees through the phase shifter 106 to produce the quadrature baseband signal. The demodulators 103 and 104 are enabled or disabled in reponse to the control signals applied to their control terminals 122 and 124, respectively.

Figure 5A:
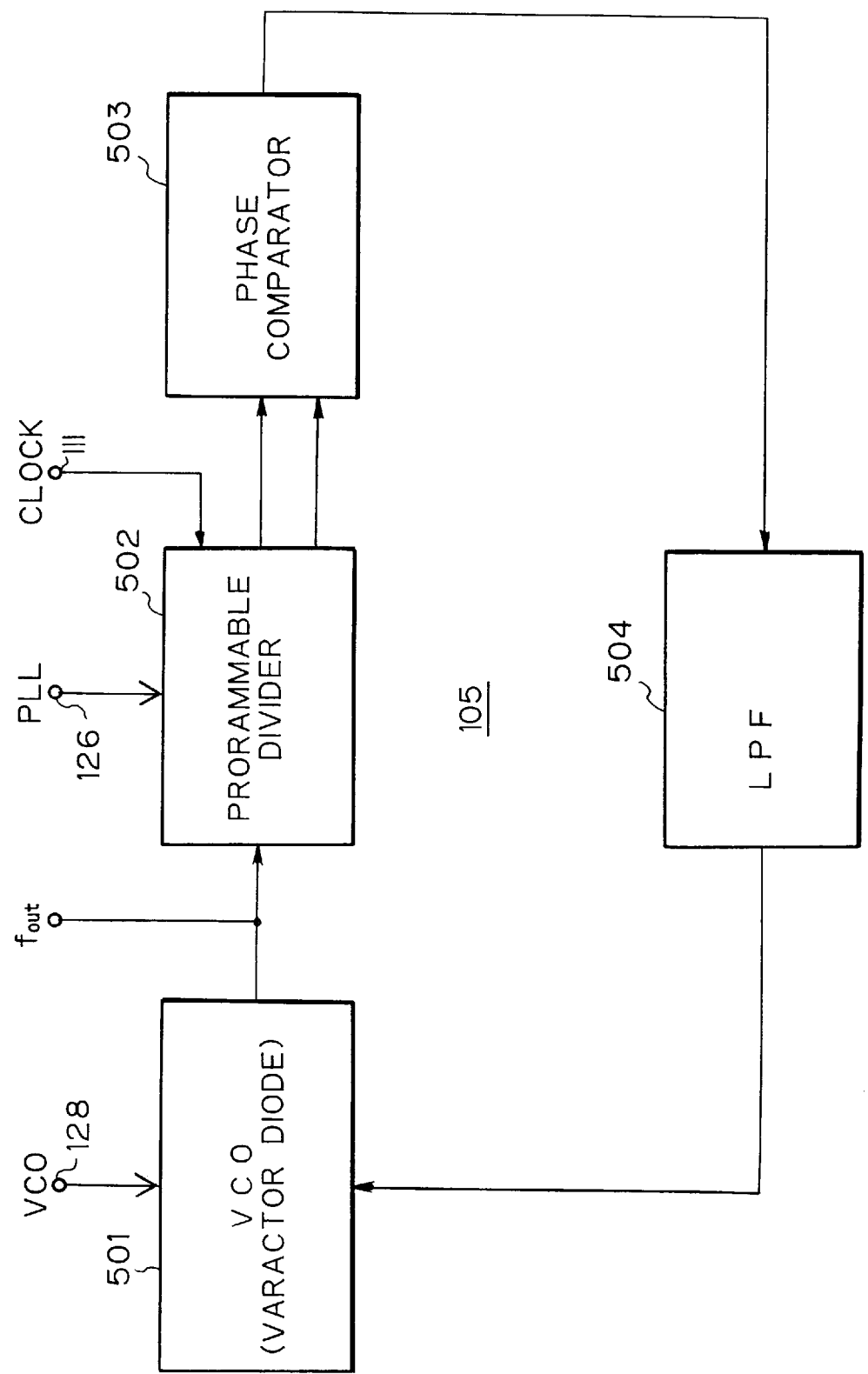
FIG. 5A is a schematic block diagram showing a frequency synthesizer in the embodiment.

The first frequency synthesizer 105 includes as shown in FIG. 5A a voltage controlled oscillator (VCC) 501, a programmable divider 502, a phase comparator 503 and a lowpass filter (LPF) 504 to form a phase-locked loop (PLL). The frequency of the local oscillation signal generated from the voltage controlled oscillator 501 is adjusted by a loop circuit including the programmable divider 502, phase comparator 503 and lowpass filter 504. The programmable divider 502 receives a clock signal applied to a reference clock terminal 111, FIG. 1, and is enabled or disabled in response to the control signal PLL applied to control terminal 126. The control signal VCO on the port 128 is applied to the voltage controlled oscillator 501. Thus, the first frequency synthesizer 105 outputs the first local oscillation frequency used for the reception in the digital mode and the second local oscillation frequency used for the reception in the analog mode.

Returning to FIG. 1, the phase shifter 106 is adapted to shift the phase of the local oscillation frequency output from the first frequency synthesizer 105 by 90 degrees, and in turn supply the phase shifted signal to the second demodulator 104 and the buffer 109.

The first buffer 107 is an output circuit for amplifying the in-phase signal demodulated by the first demodulator 103, and for outputting the amplified signal to the digital baseband signal processing stage. The first buffer 107 is enabled or disabled in response to a control signal applied to its control terminal 130. Likewise, the second buffer 108 is an output circuit for amplifying the quadrature signal demodulated by the second demodulator 104, and for outputting the amplified signal to the digital baseband signal processing stage. The second buffer 108 is enabled or disabled in response a control signal applied to its control terminal 132. The third buffer 109 is also an output circuit for supplying the second local oscillation frequency fed from the first frequency synthesizer 105 via the phase shifter 106 to the analog IF stage 40, FIG. 2, through the output terminal 15. It is enabled or disabled in response to a control signal applied to its control terminal 134.

The modulator section 200, on the other hand, includes three input buffers 208, 209 and 210, two modulators 204 and 205, a second frequency synthesizer 206, a phase shifter 207, two output buffers 202 and 203, and a multiplier 201. The first input buffer 208 is an input circuit for accepting an in-phase signal from the digital baseband signal processor stage, and for supplying the signal to the first modulator 204. The latter is enabled or disabled in response to a control signal applied to its control terminal 220. The second input buffer 209 is an input circuit for accepting a modulating signal from the analog baseband signal processor stage, and for supplying the signal to the second frequency synthesizer 206. It is enabled or disabled in response to a control signal applied to its control terminal 222. The third input buffer 210 is also an input circuit for receiving a quadrature signal from the digital baseband signal processor stage, and for supplying the signal to the second modulator 205. It is enabled or disabled in response to a control signal applied to its control terminal 224.

The first modulator 204 and the second modulator 205 constitute a quadrature modulator. The first modulator 204 modulates the in-phase digital baseband signal fed via the first input buffer 208 by the local oscillation frequency fed from the second frequency synthesizer 206. The second modulator 205 modulates the quadrature digital baseband signal fed via the third input buffer 210 by the local oscillation frequency fed from the second frequency synthesizer 206 via the phase shifter 207. The modulators 204 and 205 are enabled or disabled in response to the control signals applied to their control terminals 228 and 232, respectively.

The second frequency synthesizer 206 includes, like the first frequency synthesizer 105 in the modulator section 100 as shown in FIG. 5A, a voltage controlled oscillator 501, a programmable divider 502, a phase comparator 503 and a lowpass filter (LPF) 504. The frequency of the local oscillation signal generated from the voltage controlled oscillator 501 is adjusted by a phase-locked loop including the programmable divider 502, phase comparator 503 and lowpass filter 504. The second frequency synthesizer 206 outputs the third local oscillation frequency used for the digital modulation and the fourth local oscillation frequency used for the analog modulation in response to the reference clock signal from the main controller and control signals applied to its control terminals 234 and 235. In particular, the voltage controlled oscillator of the instant embodiment includes a variable capacitance diode (varactor diode) to which the analog modulated signal is applied from the second input buffer 209. Thus, the fourth local oscillation frequency is frequency modulated by the modulating signal, thereby generating an analog IF signal in the analog mode.

The phase shifter 207 shifts the phase of the third local oscillation frequency from the second frequency synthesizer 206 or the phase of the frequency modulated analog IF signal, and outputs the phase shifted signal to the second modulator 205. The output buffer 202, which is enabled or disabled in response to the control signal applied to its control terminal 236, is an output circuit for supplying the multiplier 201 with the IF modulated signal fed from the first modulator 204. The output buffer 203, which is enabled or disabled in response to the control signal applied to its control terminal 238, is an output circuit for supplying the multiplier 201 with the IF modulated signal fed from the second modulator 205.

The multiplier 201, which is enabled or disabled in response to the control signal applied to its control terminal 240, is adapted for supplying the RF stage with the product of the two IF signals fed from the output buffers 202 and 203. It produces the quadrature modulated signal obtained by multiplying the in-phase signal by the quadrature signal in the digital mode, while it also functions as a buffer circuit for buffering the analog signal output only from the second modulator 205 in the analog mode.

Figure 5B:
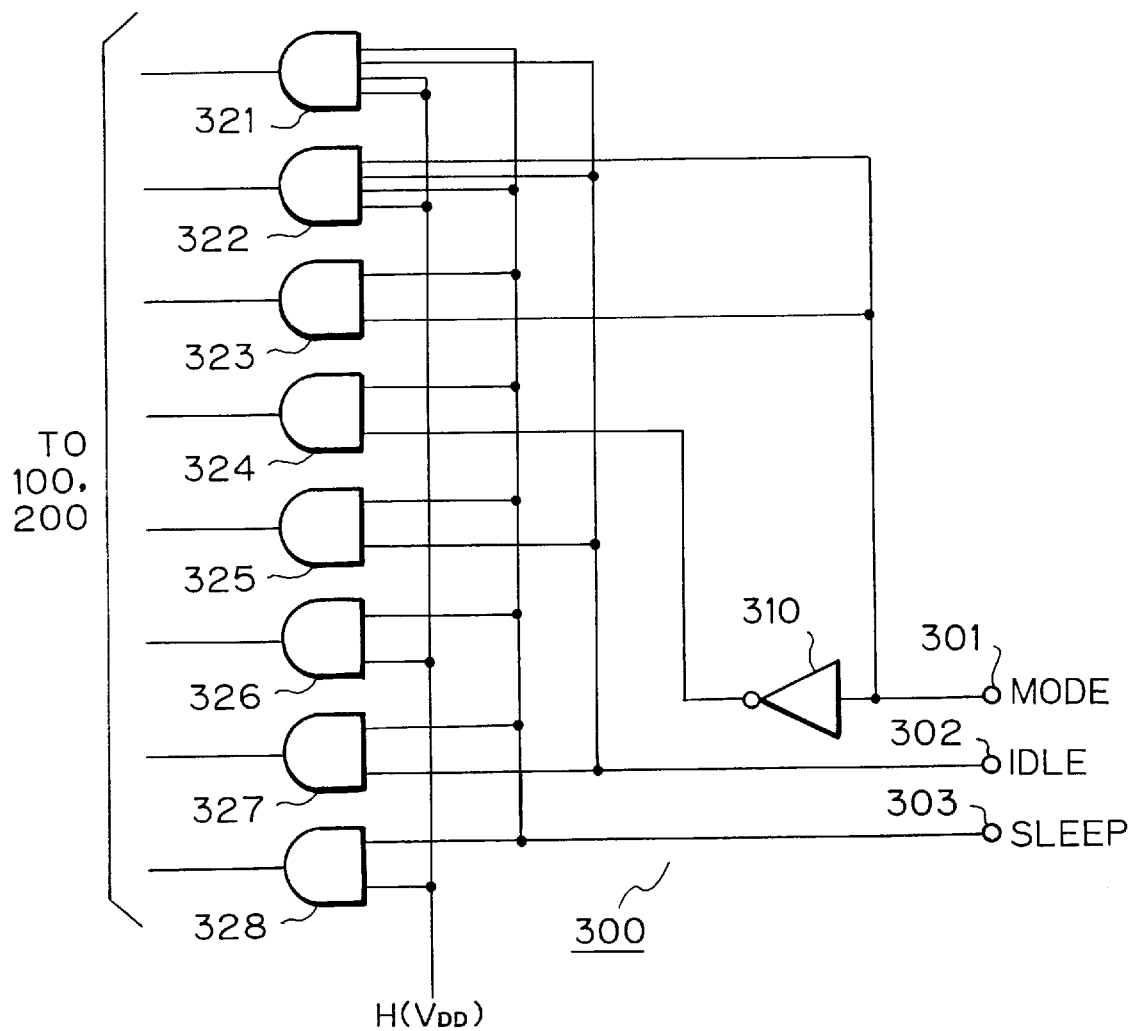
FIG. 5B is a functional circuit diagram showing a configuration of the switching controller of the embodiment.

The switching control 300 comprises a combination of a plurality of logic circuits 310 and 321–328, including a mode terminal 301, an idle terminal 302 and a sleep terminal 303 as shown in FIG. 5B. The mode terminal 301 is provided with a mode switching signal which is set "High" in the digital mode, and "Low" in the analog mode as shown in FIG. 3. The mode switching signal is delivered to gates 322 and 323 directly, and to a gate 324 through an inverter 310. The idle terminal 302 is supplied with an idle signal which is set "Low" in the receiving mode, that is, so-called a waiting mode, and "High" in the transmitting mode. The idle signal is delivered to gates 321, 322, 325 and 327. The sleep terminal 303 is provided with a sleep signal which is set "Low" when the demodulator section 100 and the modulator section 200 temporarily stop their operation to enter power down or saving operation. The sleep signal is delivered to all the gates 321–328. A high voltage VDD is applied to the gates 321, 322, 326 and 328.

Referring to FIGS. 1 and 5B, the gate 321 has an ouptut supplied to the multiplier 201, output buffer 203 and second modulator 205 to enable them in both the digital and analog transmitting modes. The gate 322 has an output supplied to the output buffers 202, 208 and 210, and to the first modulator 204 to enable them in the digital transmitting mode. The gate 323 has an output supplied to the buffer circuit 102, first demodulator 103, second demodulator 104, and input buffers 107 and 108 to enable them in the digital receiving mode and digital transmitting mode. The gate 324 has an output supplied to the buffers 109 and 209 to enable them in the analog receiving mode and analog transmitting mode. The gate 325 has an output supplied to the VCO input 234 of the second frequency synthesizer 206 to enable its VCO 501 in both the digital and analog transmitting mode. The gate 326 has an output supplied to the VCO input 128 of the first frequency synthesizer 105 to enable its VCO 501 in all the modes except for the sleep mode. The gate 327 has an output supplied to the PLL input 235 of the second frequency synthesizer 206 to enable it in the digital and analog transmitting mode. The gate 328 has an output supplied to the PLL input 126 of the first frequency synthesizer 105 to enable it in all the modes except for the sleep mode.

Next, the operation of the instant illustrative embodiment will be described with reference to FIGS. 3 and 4.

(1) Digital Receiving (Idle) mode

In the digital receiving mode, the mode signal applied to the mode terminal 301 is set at "High" (digital), the idle signal applied to the idle terminal 302 is set at "Low", and the sleep signal applied to the sleep terminal 303 is set at "High" as shown in FIG. 3. Thus, the outputs of the gates 323, 326 and 328 are set at "High", and the outputs of the gates 321, 322, 324, 325 and 327 are set at "Low". Accordingly, the entire elements of the digital IF stage 100 except for the buffer 109 are enabled, and the entire elements of the modulator section 200 are disabled. Thus, the first frequency synthesizer 105 generates the first local oscillation frequency.

In this state, when the received signal downconverted by the RF stage is supplied to the input terminal 20, it is delivered to the first and second demodulators 103 and 104 via the buffer circuit 102. The first demodulator 103 demodulates the received signal by the first local oscillation frequency (sinusoidal wave) from the first frequency synthesizer 105 to generate the baseband in-phase signal. The in-phase signal is output to the baseband signal processing stage via the buffer 107.

Likewise, the second demodulator 104 demodulates the received signal by the first local oscillation frequency with its phase shifted by 90 degrees (cosine wave) by the phase shifter 106 to generate the baseband quadrature signal. The quadrature signal is output via the buffer 108 to the baseband signal processing stage which carries out additional processing of the in-phase and quadrature signals. Thus, the digital reception is performed.

(2) Digital Receiving/Transmitting (Operating) Mode

In the digital receiving/transmitting mode, the mode signal, the idle signal and the sleep signal are all set at "High". Thus, the outputs of the entire gates except for the gate 324 are set at "High". Accordingly, all the elements except for the buffers 109 and 209 are enabled, and the first frequency synthesizer 105 generates the first local oscillation frequency for the quadrature detection, and the second frequency synthesizer 206 generates the third local oscillation frequency for the quadrature modulation.

In this state, when the in-phase signal and quadrature signal are supplied to the modulator section 200 from the digital baseband signal processing stage, the in-phase signal is fed to the first modulator 204 via the first input buffer 208, and the quadrature signal is fed to the second modulator 205 via the third input buffer 210. The first modulator 204 modulates the in-phase signal by the third local oscillation frequency (sine wave) from the second frequency synthesizer 206 to generate the in-phase component of the quadrature modulation, and supplies it to the multiplier 201 through the output buffer 202. Likewise, the second modulator 205 modulates the quadrature signal by the third local oscillation frequency with its phase shifted by 90 degrees (cosine wave) by the phase shifter 207 to generate the quadrature component of the quadrature modulation, and supplies it to the multiplier 201 through the output buffer 203. The in-phase and quadrature components obtained by the quadrature modulation are thus multiplied by the multiplier 201 to be output to the RF stage which impresses those components on a carrier, and transmits it.

(3) Analog Receiving (Idle) Mode

In the analog receiving mode, both the mode signal and idle signal are set at "Low", and the sleep signal is set at "High" as shown in FIG. 3. Thus, the outputs of the gates 324, 326 and 328 are set at "High". Accordingly, the first frequency synthesizer 105 and the buffers 109 are enabled, and the first frequency synthesizer 105 generates the second local oscillation frequency. The second local oscillation frequency is supplied to the analog IF stage 40 in FIG. 2 through the phase shifter 106, the buffer 109 and the output terminal 15.

In this state, the analog received signal from the RF stage is mixed with the second local oscillation frequency in the analog IF stage 40 to be demodulated to the baseband signal. The baseband signal is fed to the analog baseband signal processing stage, which recovers the transmitted information from the analog signal.

(4) Analog Receiving/Transmitting (Operation) Mode

In the analog receiving/transmitting or duplexer mode, the mode signal is set at "Low", and both the idle signal and sleep signal are set at "High" as shown in FIG. 3. The outputs of the entire gates except for the gates 322 and 323 are thus set at "High". Accordingly, all the elements associated with the analog transmission are enabled as shown in FIG. 4. In particular, the multiplier 201, output buffer 203, second modulator 205, second frequency synthesizer 206 and second input buffer 209 are enabled, and the second frequency synthesizer 206 generates the fourth local oscillation frequency for the analog modulation.

In this state, when a voice signal or the like is input to the analog baseband signal processing stage, the input signal is supplied to the buffer 209 as the modulating signal. The modulating signal is supplied to the variable capacitance diode in the VCO 501 of the second frequency synthesizer 206 so that the fourth local oscillation frequency is frequency modulated into the IF signal by the variation in the capacitance of the diode. The IF signal is fed to the second modulator 205 via the phase shifter 207, and is supplied to the RF stage through the output buffer 203 and multiplier 201. The RF stage impresses the IF signal on a carrier, and transmits it.

(5) Sleep Mode

In the sleep mode, the sleep signal applied to the sleep terminal 303 is set at "Low". Accordingly, the outputs of all the gates 321-328 are placed at "Low". As a result, all the elements of the demodulator section 100 and modulator section 200 are disabled, thus entering the sleep mode. In this state, the RF stage and the baseband signal processing stage are also kept OFF, with only the controller kept ON, thus entering a power sown or saving state. This makes it possible to minimize the consumption of the battery power.

As described above, according to the embodiment of the digital-analog shared circuit of the dual mode radio equipment in accordance with the present invention, the first frequency synthesizer 105 in the demodulator section 100 generates the first local oscillation frequency in the digital receiving mode and the second local oscillation frequency in the analog receiving mode. Furthermore, the elements associated with the two modes are enabled in response to those modes. Therefore, the two local oscillation frequencies needed for the digital reception and analog reception are effectively generated by the first frequency synthesizer 105 without employing two separate local oscillators. This makes it possible to simplify the receiver circuit and to reduce the cost of the equipment.

Likewise, the second frequency synthesizer 206 in the modulator section 200 generates the third local oscillation frequency in the digital transmitting mode and the fourth local oscillation frequency in the analog transmitting mode. Furthermore, the elements associated with the two modes are enabled in response to those modes. Therefore, the two local oscillation frequencies needed for the digital transmission and analog transmission are effectively generated by the second frequency synthesizer 206 without employing two separate local oscillators. This makes it also possible to simplify the transmitter circuit and to further reduce the cost of the equipment.

Although the output buffer 109 which produces the analog local oscillation frequency is connected to the output of the phase shifter 106, it may be connected to the output of the first frequency synthesizer 105 which is connected to the input of the first demodulator 103. Likewise, although the analog modulated signal is output through the second modulator 205, it may be output through the first modulator 204.

In addition, although the buffers are employed as the input and output circuits, they can be replaced by switching circuits. Moreover, although the frequency synthesizers 105 and 206 generate the local oscillation frequencies which are the same as the intermediate frequencies, this is not essential. For example, they may each oscillate frequencies N times the intermediate frequencies, divide them to 1/N by dividers, and supply them to the modulator circuit and the demodulator circuit. This makes it possible to prevent interference.

While the present invention has been described with reference to the particular illustrative embodiment, it is not to be restricted by the embodiments. It is to be appreciated that those skilled in the art can change or modify the embodiment without departing from the scope and spirit of the present invention.

What is claimed is:

1. A digital-analog shared circuit in dual mode radio equipment having a digital mode and an analog mode, said digital-analog shared circuit comprising:

an analog receiver for obtaining an analog baseband signal by downconverting a received signal by a local oscillation frequency;

a digital receiver for obtaining a digital baseband signal consisting of an in-phase signal and a quadrature signal by quadrature detecting said received signal;

a digital transmitter for generating a digital transmitted signal by quadrature modulating a digital baseband signal;

an analog transmitter for generating an analog transmitted signal by frequency modulating a local oscillation frequency signal by an analog baseband signal; and a control circuit for switching between the digital mode and the analog mode by controlling said analog receiver and said digital receiver, and by controlling said digital transmitter and said analog transmitter, wherein said digital receiver includes a first frequency synthesizer for generating a first local oscillation frequency for the quadrature detection in response to a first control signal from said control circuit, said first frequency synthesizer generating, in response to a second control signal from said control circuit, a second local oscillation frequency which is supplied to said analog receiver as a local oscillation signal for the downconversion, said digital transmitter including a second frequency synthesizer for generating a third local oscillation frequency for the quadrature modulation in response to a third control signal from said control circuit, said second frequency synthesizer generating, in response to a fourth control signal from said control circuit, a fourth local oscillation frequency for analog modulation, said second frequency synthesizer including a modulator for frequency modulating the analog baseband signal.

2. The digital-analog shared circuit in accordance with claim 1, wherein said digital receiver comprises a buffer circuit for developing the received signal in the form of the in-phase signal and the quadrature signal, a first demodulator for demodulating the in-phase signal fed from said buffer circuit by the first local oscillation frequency fed from said first frequency synthesizer, a phase shifter for shifting a phase of said first local oscillation frequency fed from said first frequency synthesizer by 90 degrees, and a second demodulator for demodulating the phase shifted local oscillation frequency fed from said phase shifter by the quadrature signal fed from said buffer circuit, said control circuit driving, in a digital receiving mode, said digital receiver by enabling said buffer circuit, said first demodulator, said second demodulator, and said first frequency synthesizer, and providing, in an analog receiving mode, said analog receiver with the second local oscillation frequency from said first frequency synthesizer by disabling said buffer circuit, said first demodulator and said second demodulator, and enabling said first frequency synthesizer.

3. The digital-analog shared circuit in accordance with claim 2, wherein said phase shifter is connected to an output circuit for outputting the second local oscillation frequency to said analog receiver, and said control circuit enabling, in the analog receiving mode, said output circuit to provide said analog receiver with said second local oscillation frequency from said first frequency synthesizer through said phase shifter.

4. The digital-analog shared circuit in accordance with claim 1, wherein said digital transmitter comprises:

a first modulator for modulating the in-phase signal of the digital baseband signal by the third local oscillation frequency fed from said second frequency synthesizer;

a phase shifter for shifting a phase of said third local oscillation frequency fed from said second frequency synthesizer by 90 degrees;

a second modulator for modulating the phase shifted local oscillation frequency fed from said phase shifter by the quadrature signal of the digital baseband signal; and a multiplier for multiplying signals fed from said first modulator and said second modulator, said control circuit driving, in a digital transmitting mode, said digital transmitter by enabling said first modulator, said second modulator, said multiplier and said second frequency synthesizer.

5. The digital-analog shared circuit in accordance with claim 1, wherein said second frequency synthesizer comprises a voltage controlled oscillator including a variable capacitance diode, said control circuit enabling, in said analog transmitting mode, said second frequency synthesizer, said multiplier of said digital transmitter, and one of said first modulator and second modulator to output, from said multiplier through said one of said first modulator and second modulator, the transmitted signal being modulated with the analog baseband signal fed to said variable capacitance diode of said voltage controlled oscillator, and being produced from said second frequency synthesizer.

6. The digital-analog shared circuit in accordance with claim 1, wherein said first frequency synthesizer includes a first frequency divider and said second frequency synthesizer includes a second frequency divider, said first frequency divider and said second frequency divider each varying a dividing ratio of their oscillation frequencies, said control circuit enabling said first frequency divider and said second frequency divider to produce said first local oscillation frequency and said third local oscillation frequency in said digital mode, and enabling said first frequency divider and said second frequency divider to produce said second local oscillation frequency and said fourth local oscillation frequency in said analog mode.

7. The digital-analog shared circuit in accordance with claim 1, wherein said control circuit comprises a combination of a plurality of logic circuits, and wherein said control circuit, receiving a mode switching signal commanding switching between said digital mode and said analog mode, an idle signal commanding reception only, and a sleep signal commanding suspension of digital operation, supplies said mode switching, idle, and sleep signals to said digital receiver and said digital transmitter through said logic circuits to control switching among respective modes.

* * * * *